(12) United States Patent
Thulbon

(10) Patent No.: US 7,708,225 B2
(45) Date of Patent: May 4, 2010

(54) AIRCRAFT LANDING GEAR

(75) Inventor: Jonathan Thulbon, Cheltenham (GB)

(73) Assignee: Messier-Dowty Limited, Gloucestershire (GB)

( * ) Notice: Subject to any disclaimer, the term of this patent is extended or adjusted under 35 U.S.C. 154(b) by 280 days.

(21) Appl. No.: 11/658,407

(22) PCT Filed: Jul. 18, 2005

(86) PCT No.: PCT/GB2005/002815

§ 371 (c)(1),
(2), (4) Date: May 22, 2007

(87) PCT Pub. No.: WO2006/010890

PCT Pub. Date: Feb. 2, 2006

(65) Prior Publication Data

US 2008/0272234 A1     Nov. 6, 2008

(30) Foreign Application Priority Data

Jul. 27, 2004   (GB) ................................. 0416740.9

(51) Int. Cl.
*B64C 25/26* (2006.01)
(52) U.S. Cl. .................................. 244/102 SL; 244/50
(58) Field of Classification Search ............. 244/102 R, 244/102 SL, 102 A, 102 SS, 50
See application file for complete search history.

(56) References Cited

U.S. PATENT DOCUMENTS 2,116,395 A    5/1938   Henrichsen
2,292,671 A *  8/1942   Sumner et al. ......... 244/102 SL
2,338,572 A *  1/1944   Corwin ......................... 244/50
2,371,699 A *  3/1945   Martin .................... 244/102 A
2,535,167 A * 12/1950   Smith et al. ................... 244/50
2,732,151 A *  1/1956   Stoner ......................... 244/50
2,866,609 A * 12/1958   Stout ........................... 244/50
3,006,579 A * 10/1961   Frederick ..................... 244/50
3,391,580 A *  7/1968   Stadler ..................... 74/388 R
3,489,376 A *  1/1970   Steffen et al. ................. 244/50
4,556,179 A * 12/1985   Veaux et al. ............ 244/102 R
4,984,755 A *  1/1991   Derrien ................. 244/102 SS
5,029,775 A *  7/1991   Abramovitsh ........... 244/102 R
5,086,994 A *  2/1992   Donnelly et al. .............. 244/50
5,333,816 A *  8/1994   Del Monte .................... 244/50

FOREIGN PATENT DOCUMENTS

DE       12 37 906       3/1967
FR       894 675 A       1/1945
GB       2 287 681 A     9/1995
SU       524 354 A1     12/1995

* cited by examiner

*Primary Examiner*—Michael R Mansen
*Assistant Examiner*—Brian M O'Hara
(74) *Attorney, Agent, or Firm*—The Nath Law Group; Jerald L. Meyer; Robert T. Burns

(57) ABSTRACT

Aircraft landing gear includes a retractable housing comprising an upper leg (11); a lower leg (15) including a wheel axle (16) slidingly disposed within the upper leg (11) and resiliency biassed to an extended condition; a turning collar (18) rotatably disposed about the housing and having connection means for a drag stay (17); and a steering collar (19) operatively connected to a steering motor (41) and connected to the lower leg (15) by a torque link (21, 22); in which the turning collar (18) is provided with a cam surface (24) which cooperates in use with the torque link (21, 22) to maintain the lower leg (15) with the wheel in the fore-and-aft position when in the extended condition.

13 Claims, 4 Drawing Sheets

AIRCRAFT LANDING GEAR

This invention relates to aircraft landing gear and in particular to the nosewheel and leg assemblies of landing gear.

The leg of an aircraft nosewheel is required to be rotatable about its longitudinal axis, under the control of the pilot, for imparting steering ability to the aircraft when on the ground. However, for take-off and landing purposes, it is necessary for the leg to be locked with the nosewheel in the fore-and-aft orientation. In the case of some aircraft, it is a requirement, due to considerations of available storage space within the fuselage, for the leg and nosewheel to rotate about the longitudinal axis of the leg when it is retracted, so that the wheel lies with its plane horizontal (or, at least, at a disposition other than vertical) within the fuselage when in the stored, in-flight, position. The nosewheel should thus be non-rotatable about the leg axis for take-off and landing, the leg itself then being locked so that the wheel is in fore-and-aft alignment, while being rotatable about the leg axis when the aircraft is on the ground with the landing gear under compression loading from the weight of the aircraft.

In a known arrangement, a turning tube which accommodates the slidable piston of a shock absorber is mounted in a main housing which incorporates trunnion arms and lugs for attachment of the retraction actuator. The turning tube, to which the wheel is attached via the shock absorber, is rotatable relative to the housing, and has a collar driven by a steering motor attached to the turning tube, for ground steering purposes. Rotational movement of the collar is transmitted to the wheel, mounted at the lower end of the shock absorber piston, by articulated arms forming a torque link. A drag brace is connected between the aircraft fuselage and lugs attached to the turning tube below the main housing, the geometry of the drag brace being such that, as the main housing is pivoted about the trunnion arms on retraction under the influence of the retraction actuator, the brace causes the turning tube to rotate, whereby the wheel twists as it retracts to assume the intended storage position. With the leg in the fully-extended position—that is, while the aircraft is in flight regardless of whether the gear is stored or deployed for landing—the slidable piston is disposed at the end of its travel and engages centring cams inside the turning tube, thus maintaining the wheel in fore-and-aft alignment ready for landing and also ensuring that the wheel twists with the taming tube on retraction. While on the ground, on the other hand, the weight of the aircraft causes the slidable piston to disengage from the centring cams, thus allowing the piston, and hence the wheel, to be rotated for steering purposes.

The incorporation of a turning tube adds to manufacturing costs and also to weight, since it requires a large forging. While the turning tube could be replaced by a lighter and cheaper collar, on which the steering motor would be carried, the collar would not allow the use of the centring cams. In the event of loss of hydraulic pressure, the steering motor could back drive and allow the gear to retract with the wheel out of position, or allow the gear to become lowered without the wheel being in fore-and-aft alignment.

It is an object of the present invention to provide aircraft landing gear which avoids the problems as discussed above.

In one aspect, the present invention provides aircraft landing gear including a retractable housing comprising an upper leg; a lower leg including a wheel axle slidingly disposed within the upper leg and resiliently biassed to an extended condition; a turning collar rotatably disposed about the housing and having connection means for a drag stay, and a steering collar operatively connected to a steering motor and connected to the lower leg by a torque link; in which the turning collar is provided with a cam surface which cooperates in use with the torque link to maintain the lower leg with the wheel in the fore-and-aft position when in the extended condition.

The drag stay, when connected between the connection means and the aircraft fuselage, preferably comprises upper and lower arms joined by an elbow which is releasably lockable, for example by means of an over-centre lock, when the arms are in alignment and the landing gear is in the lowered condition. The drag stay is fitted at an acute angle to the fore-and-aft aircraft axis so that, on retraction of the landing gear by pivoting of the housing about a lateral axis under the influence of an actuator attached to a retraction lug formed on the housing, the elbow joint is released from its locked condition and folds while exerting a sideways, and hence turning, force on the turning collar. Since, on retraction of the gear, the lower leg is in the fully extended condition, the turning force is transmitted to the lower leg through the torque link, the cam surface of the turning collar acting in cooperation with the torque link to maintain the lower leg with the wheel fixed in the fore-and-aft position relative to the turning collar.

Preferably, the steering motor is mounted on the steering collar and engages with pinion teeth attached to the turning collar, whereby the motor rotates relative to the housing and turning collar when the gear is steered. The length of the taxiing collar and of the steering collar may thus be reduced, resulting in lighter-weight components having reduced manufacturing costs. Especially if the steering motor is of the rack and cylinder type, it can be mounted on the steering collar so as to pass below the drag stay when the gear is steered to adopt the tightest turn angle.

The cam surface of the turning collar is preferably provided at the periphery of a cam plate formed as an integral part of the turning collar and the torque link includes a cam follower which engages with the cam surface when the lower leg is in the fully-extended or nearly-extended condition.

The cam surface may comprise a linear or flat chordal surface of the periphery of the cam plate, the remainder of the periphery defiling a major arc, in which case the cam follower comprises a flat surface, which may be notional or actual, the respective flat surfaces meeting and being maintained in contact by the resilient bias acting to extend the lower leg, to retain the leg in the intended position relative to the taming collar. The cam follower may be provided with a notional flat surface by means of a pair of contact pads or protrusions formed on the upper arms of the torque link and which together bear on the flat surface of the cam plate when the lower leg is in the intended position relative to the turning collar. Alternatively, the cam surface may comprise a profiled peripheral surface to part of the cam plate, the remainder of the periphery defining a major arc, the profiled surface incorporating a shallow notch or depression and the cam follower comprising for example a finger or roller which locates in the notch or depression to maintain the intended relative positions of the lower leg and the turning collar.

Embodiments of the invention will now be described by way of example with reference to the accompanying drawings, of which:

Figure 1:
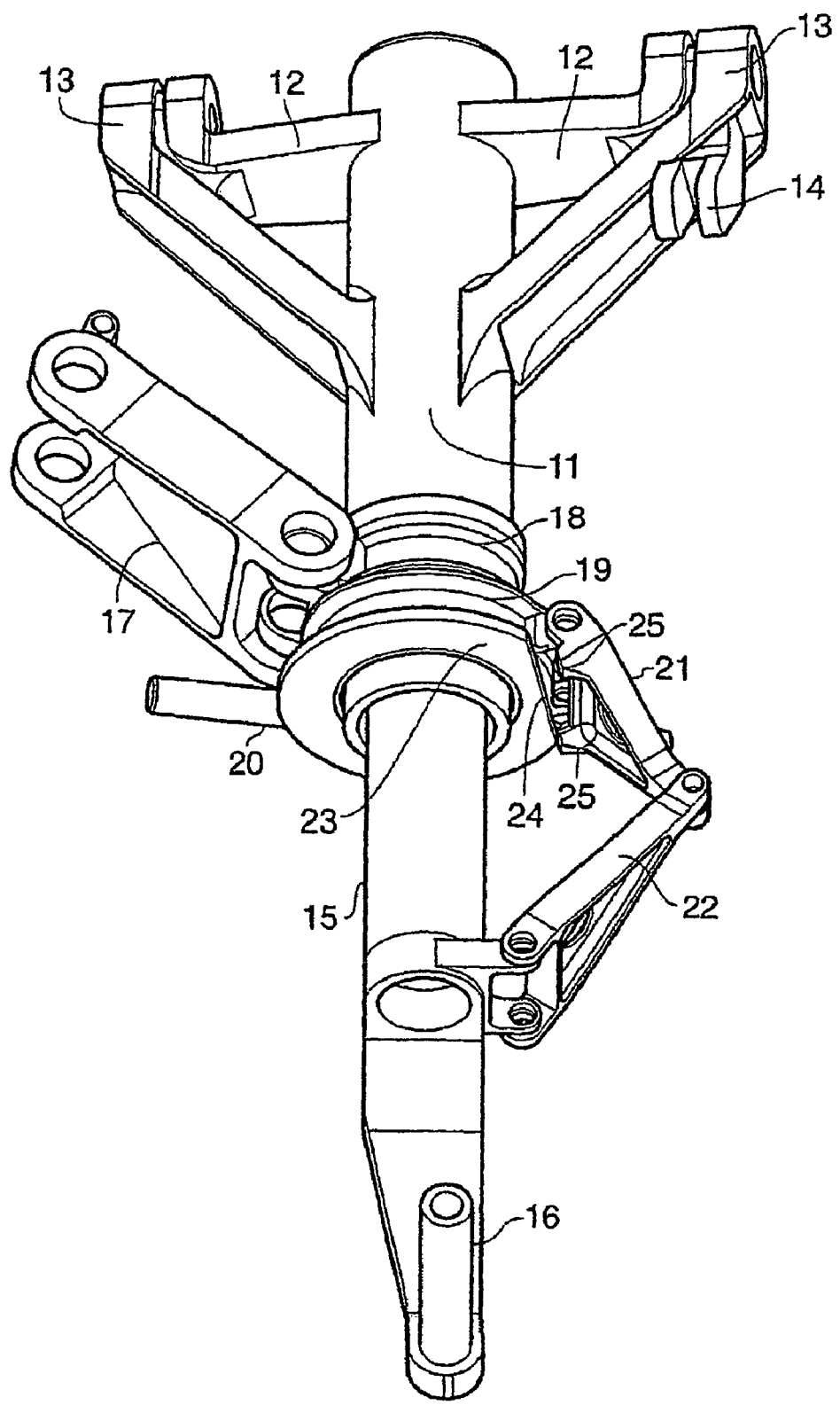
FIG. 1 is a perspective view on an aircraft nosewheel landing gear assembly in the load-compressed condition.
Figure 2:
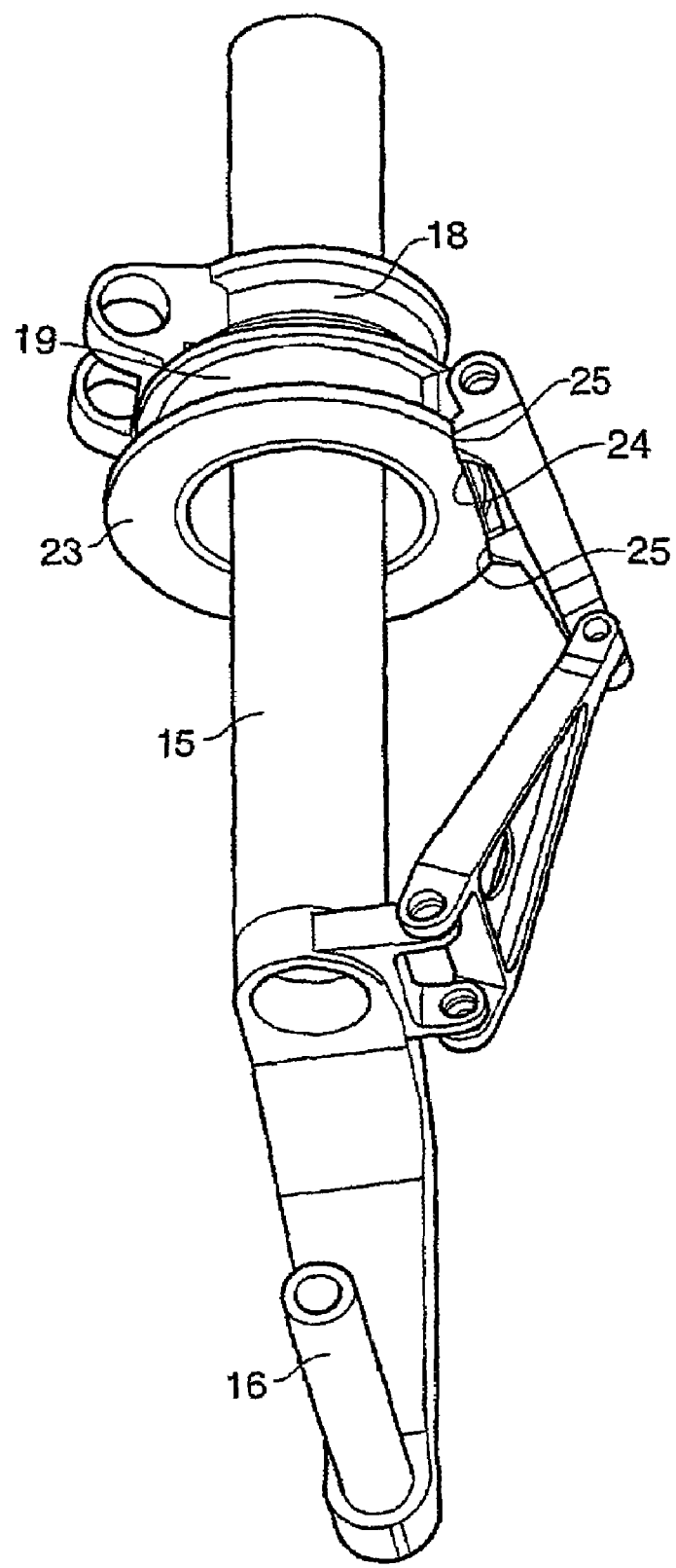
FIG. 2 is a perspective, view of part of the gear shown in FIG. 1 in the extended condition.
Figure 3:
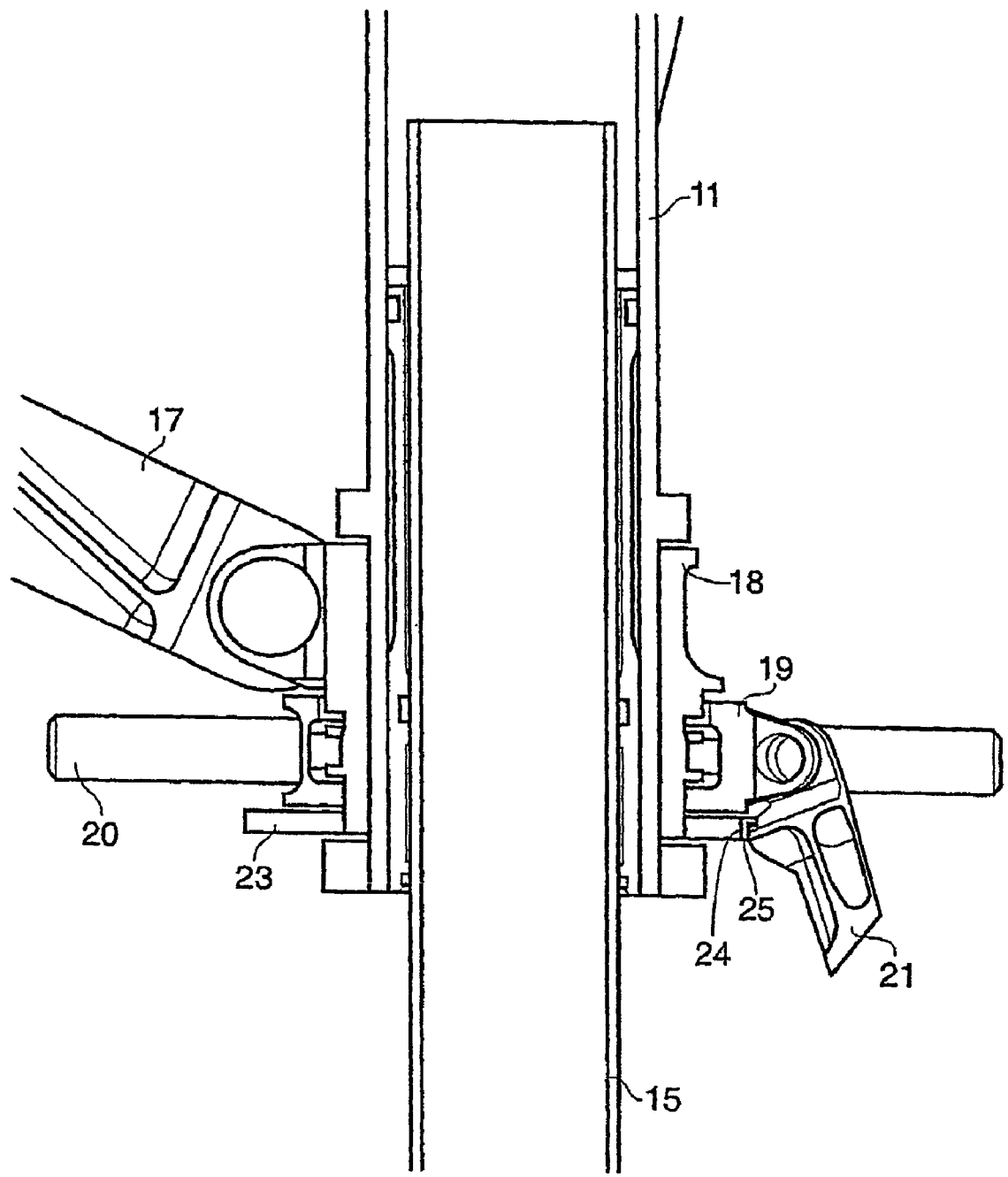
FIG. 3 is a cross-sectional fragmentary view of the assembly shown in FIGS. 1 and 2.

Referring firstly to FIGS. 1 to 3, the landing gear consists essentially of a main housing 11 including trunnion arms 12 terminating in attachment lugs 13 for pivotal attachment to the aircraft fuselage and lugs 14 for attachment of a retraction actuator (not shown). The main housing 11 accommodates the cylinder of a shock absorber, the piston 15 of which carries at its lower end a wheel axle 16. The piston is biassed to the extended position. The lower arm 17 of a drag stay, the upper arm of which is attached to the fuselage at a location displaced from the centre line thereof, is attached to a turning collar 18 rotatably mounted around the lower end of the main housing 11. A steering collar 19 is rotatably mounted about the turning collar 18 and carries a steering rack 20, the teeth of which mesh with pinion teeth formed around the turning collar 18. The steering collar 19 is connected to the lower leg constituted by the piston 15 by a torque link consisting of articulated upper and lower arms 21, 22.

In another embodiment, the pinion teeth are formed on the steering collar 19 and the rack is carried by the turning collar 18. In the former arrangement, the rack rotates with the steering collar relative to the turning collar and beneath the lower arm 17 of the drag stay, whereas in the latter arrangement the rack is non-rotatable with respect to the turning collar.

The steering collar 19 is formed with an annular disk 23 which constitutes a cam plate, the peripheral profile being that of a major arc the ends of which are joined by a flat camming surface 24. The upper arms 21 of the torque link are provided with internally-facing protrusions or pads 25 which, when the leg is fully axially extended (that is, when the aircraft is airborne and no weight is transmitted to the wheel) make contact with the cam surface of the cam plate 23, as shown in FIG. 2.

Figure 4:
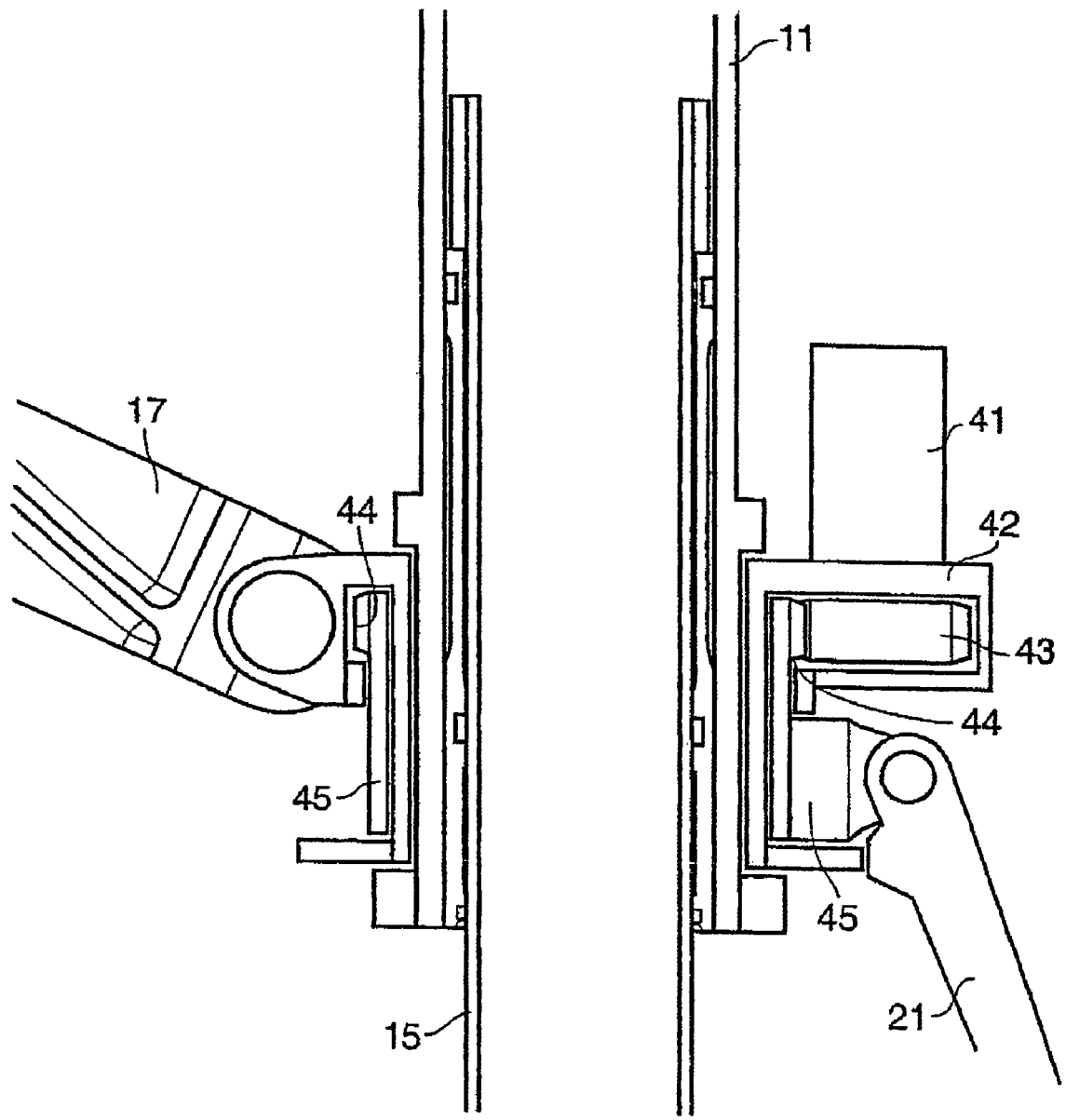
FIG. 4 is a fragmentary cross-sectional view of an alternative embodiment to that shown in FIGS. 1 to 3.

In the arrangement shown in FIGS. 1 to 3, the steering motor attached to the steering collar is hydraulically-driven and is of the rack and cylinder type, the rack operating linearly and meshing with pinion teeth attached to the turning collar, whereby on actuation of the steering gear the rack turns with the steering collar and is disposed below the drag stay, as shown in FIG. 3. However, an alternative arrangement is shown in FIG. 4, according to which the hydraulically-driven rotary motor 41 is mounted on the turning collar 42 and has an output pinion 43 the teeth of which mesh with pinion teeth 44 formed around the steering collar 45. In other respects, the arrangement of FIG. 4 is similar to that illustrated in FIG. 1 to 3 and the same reference numerals have been used where appropriate.

In use, the landing gear when retracted in flight will already be in the fully-extended condition since the resilient bias urging the lower leg downwardly from the cylinder will be operative in the absence of compression loading on the leg from the weight of the aircraft. Furthermore, the nosewheel will be in the fore-and-aft position following take-off. The gear will thus be in the position illustrated in FIG. 2, with the pads 25 of the torque link upper arm in contact with the flat cam surface 24 of the cam plate 23. During retraction of the nosewheel and as the action of the drag stay 17 causes the turning collar to rotate as the main, housing pivots about the lugs 13, the lower leg 15 will be constrained to rotate with the turning collar, thus maintaining the nosewheel in the correct orientation with respect to the turning collar during storage in the fuselage bay so that, on lowering of the landing gear in preparation for landing, the nosewheel will be deployed still in the fore-and-aft condition. Having landed and with the weight of the aircraft acting to compress the landing gear, the arms 21, 22 of the torque link are pivoted towards each other and the pads 25 become disengaged from the cam surface 24 of the cam plate 23, thereby rendering the gear steerable by means of the steering motor 20. In other words, with the aircraft on the ground, the steering collar 19 can rotate independently of the turning collar 18. If, with the leg in the extended condition, the steering motor were to become activated to turn the lower leg, the camming arrangement would allow this to happen but, equally, would allow the steering motor to be activated to return the lower leg to the fore-and-aft position of the nosewheel, whereafter the camming arrangement would maintain the lower leg in such position.

As an alternative to a flat cam surface 24, with a pad 25 formed on each side of the upper arm 21 of the torque link, thus providing a notional flat cam follower surface, the cam plate could be provided with a shallow, radially inwardly-directed notch or groove bounded on each, side by rounded shoulders merging with the arcuate surface of the remainder of the annular cam plate. The cam follower would be centrally disposed between the sides of the arm 21 of the torque link and would comprise a finger or a roller, to engage and be retained in the notch, the inwardly-sloping parts of the shoulders on each side providing a positive centring force for the cam follower and, hence, for the lower leg. Sufficient bias force is provided by the bias on the lower leg tending to the extended position, whereby the torque link is urged to the open position and the pads 25 or other cam followers are urged against the cam surface of the cam plate 23.

The invention claimed is:

1. Aircraft landing gear including a retractable housing comprising:
   an upper leg;
   a lower leg including a wheel axle slidingly disposed within the upper leg and resiliently biased to an extended condition;
   a turning collar rotatably disposed about the housing and having connection means for a drag stay configured to exert a rotational turning force on the turning collar during retraction of the landing gear; and
   a steering collar operatively connected to a steering motor and connected to the lower leg by a torque link, in which the turning collar is provided with a cam surface which cooperates in use with the torque link to maintain the lower leg with a wheel in the fore-and-aft position when in an extended condition.

2. Landing gear according to claim 1, in which the wheel axle has a wheel mounted thereon, the plane of the wheel adopting a non-vertical stowed position within the aircraft fuselage in flight.

3. Landing gear according to claim 1, in which the drag stay comprises upper and lower arms joined by an elbow which is releasably lockable when the arms are in alignment and the landing gear is in the lowered condition.

4. Landing gear according to claim 3, in which the drag stay is fitted at an acute angle to the fore-and-aft aircraft axis so that, on retraction of the landing gear by pivoting of the housing about a lateral axis, the elbow joint is released from its locked condition and folds while exerting a turning force on the turning collar, whereby the wheel mounted on the lower leg is caused to adopt the non-vertical stowed position within the aircraft fuselage in flight.

5. Landing gear according to claim 1, in which the steering motor is mounted on the steering collar and engages with pinion teeth attached to the turning collar.

6. Landing gear according to claim 5, in which the steering motor is mounted on the steering collar so as to pass below the drag stay when the gear is steered to adopt the tightest turn angle in use.

7. Landing gear according claim 1, in which the steering motor is mounted on the turning collar and actuates rotation of the steering collar.

8. Landing gear according to claim 1, in which the cam surface of the turning collar is provided at the periphery of a cam plate formed as an integral part of the turning collar, the torque link including a cam follower which engages with the cam surface when the lower leg is in an extended condition.

9. Landing gear according to claim 8, in which the cam surface-comprises a linear or flat chordal surface of the periphery of the cam plate, the cam follower comprising a flat surface.

10. Landing gear according to claim 9, in which the flat surface of the cam follower comprises a notional flat surface provided by a pair of contact pads or protrusions formed on the upper arms of the torque link and which together bear on the flat surface of the cam plate when the lower leg is in the intended position relative to the turning collar.

11. Landing gear according to claim 8, in which the cam surface comprises a profiled peripheral surface to part of the cam plate, the profiled surface incorporating a notch or depression and the cam follower comprising means for locating in the notch or depression.

12. Aircraft landing gear including a retractable housing comprising:
   an upper leg;
   a lower leg including a wheel axle slidingly disposed within the upper leg and resiliently biased to an extended condition;
   a turning collar rotatably disposed about the housing and having connection means for a drag stay; and
   a steering collar operatively connected to a steering motor and connected to the lower leg by a torque link, in which the turning collar is provided with a cam surface which cooperates in use with the torque link to maintain the lower leg with a wheel in the fore-and-aft position when in an extended condition,
   whereby on retraction of the landing gear the turning force exerted on the turning collar by the drag stay is transmitted to the lower leg through the torque link, the cam surface of the turning collar acting in co-operation with the torque link to maintain the lower leg with the wheel fixed in the fore-and-aft position relative to the turning collar.

13. Landing gear according to claim 12, wherein the drag stay is configured to exert a rotational turning force on the turning collar during retraction of the landing gear.

* * * * *